UNITED STATES PATENT OFFICE.

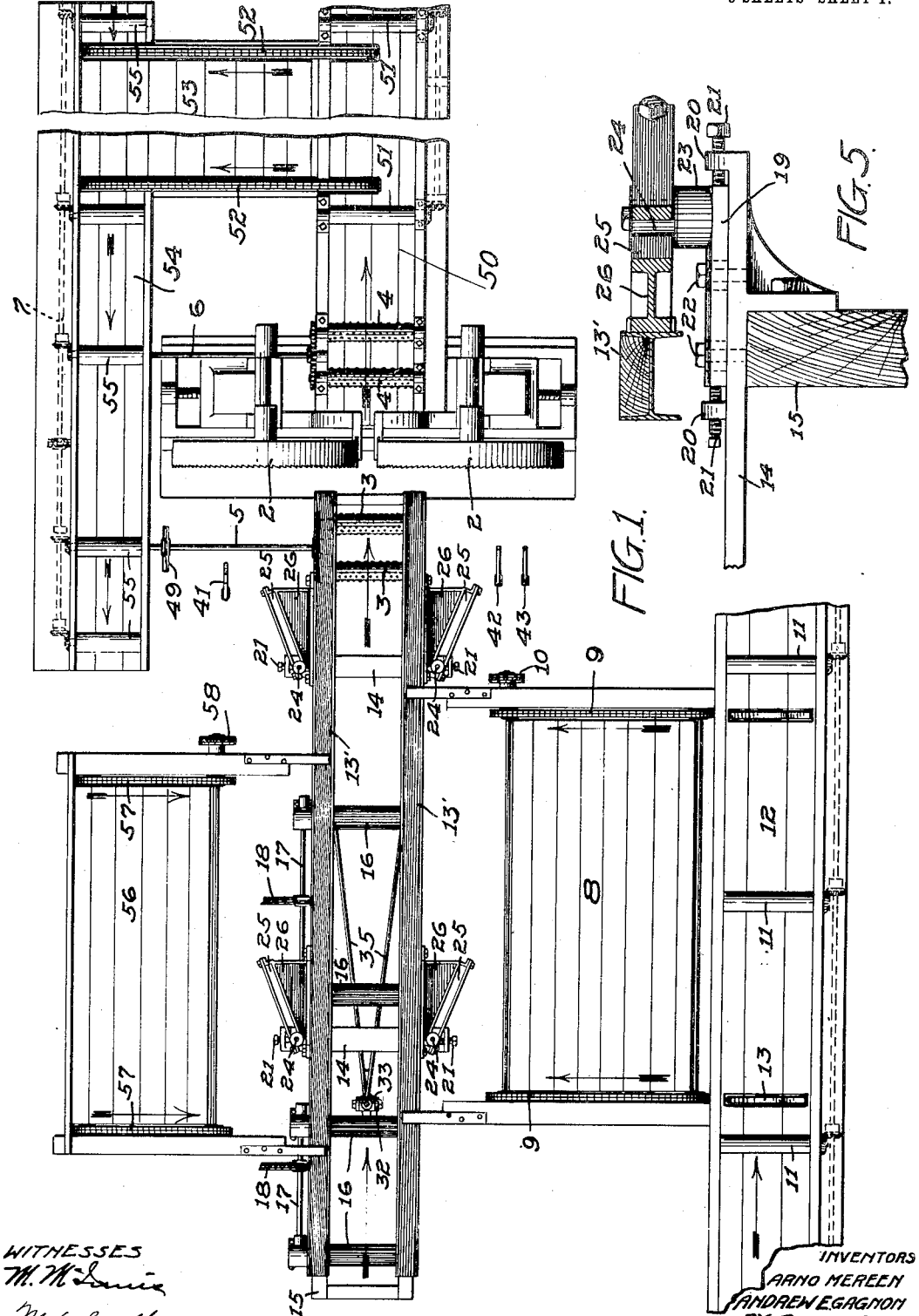

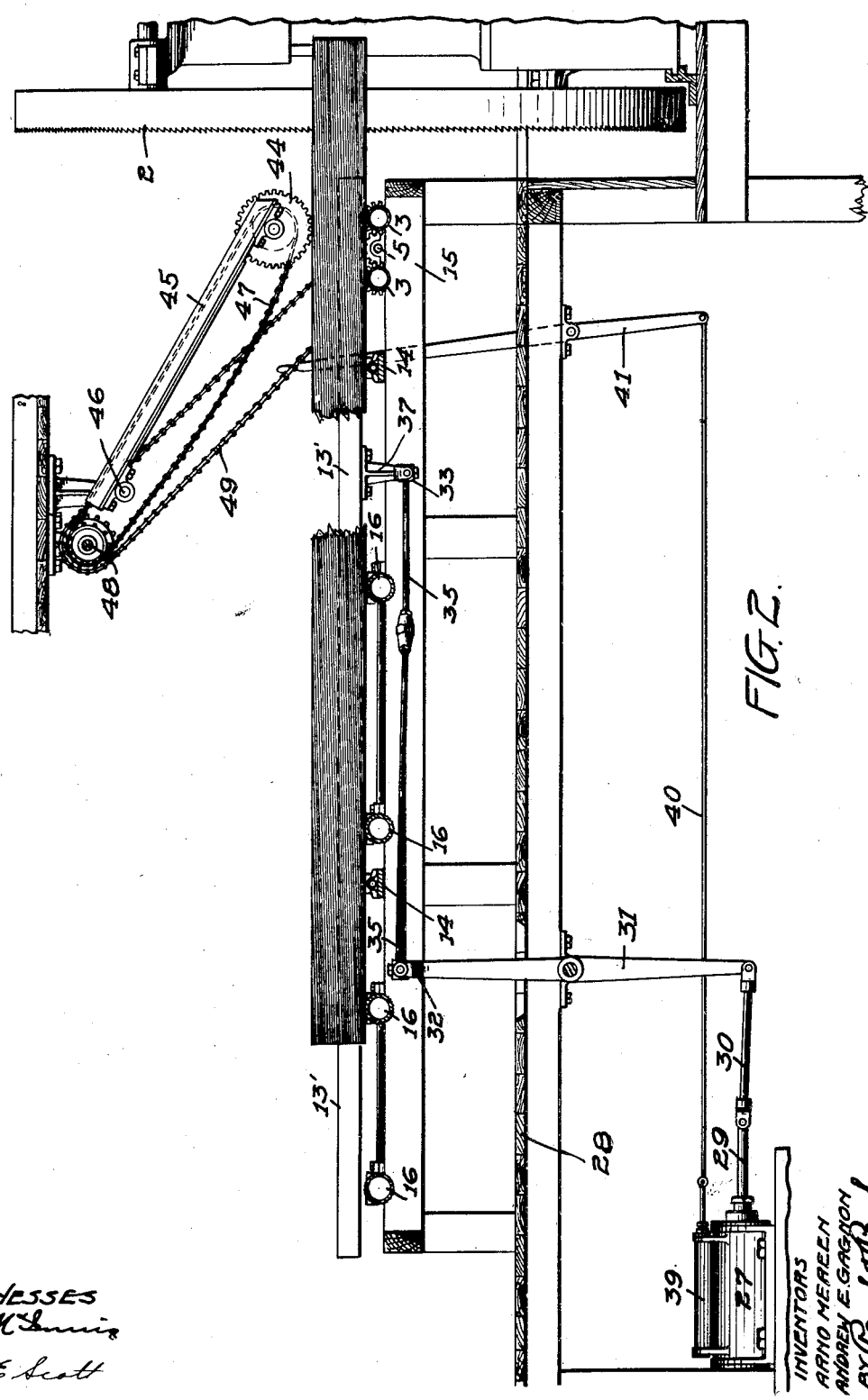

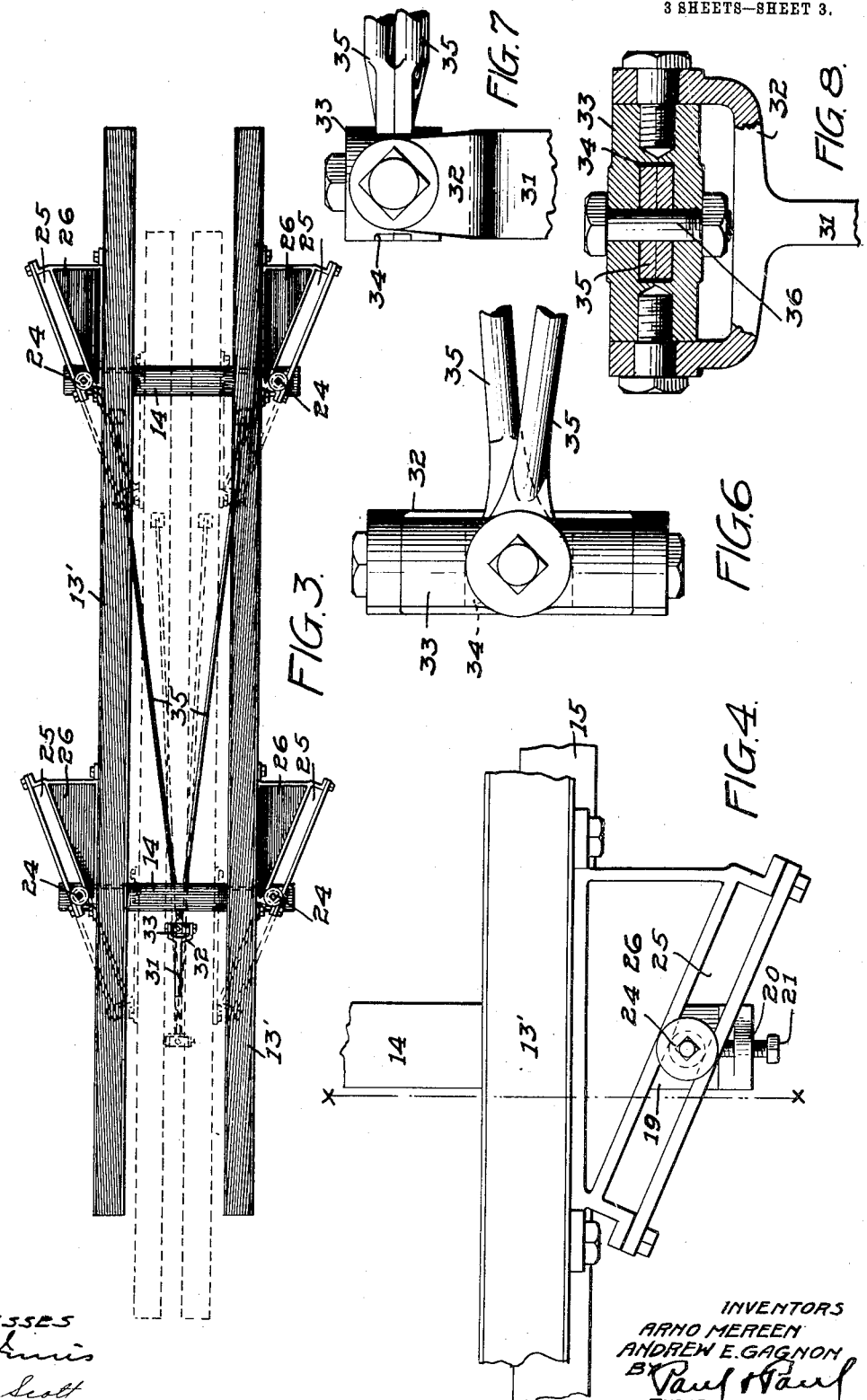

ARNO MEREEN AND ANDREW E. GAGNON, OF MINNEAPOLIS, MINNESOTA.

CANT-CENTERING DEVICE FOR TWIN-SAW MILLS.

No. 902,502.     Specification of Letters Patent.     Patented Oct. 27, 1908.

Application filed November 20, 1905, Serial No. 288,256. Renewed May 16, 1907. Serial No. 373,978.

To all whom it may concern:

Be it known that we, ARNO MEREEN and ANDREW E. GAGNON, of Minneapolis, Hennepin county, Minnesota, have invented certain new and useful Improvements in Cant-Centering Devices for Twin-Saw Mills, of which the following is a specification.

Our invention relates to means for feeding cants, or the logs from which a slab has been removed on each side, to the saws, and particularly to means for centering the cant with respect to the feed to insure a uniform cut by the saws.

The object of our invention is to provide means whereby a cant can be easily and quickly centered while moving toward the saws without delaying the sawing operation.

A further object is to provide an apparatus whereby the cants, after being passed through the saws once, can be carried around to the feeding and centering devices and put through a second time.

The invention consists generally in means for centering the cant on the feed rolls or chains before it reaches the saws.

Further, the invention consists in various constructions and combinations, all as hereinafter described and particularly pointed out in the claims.

In the accompanying drawings forming part of this specification, Figure 1 is a plan view of a twin band saw mill and the feeding and centering devices provided in connection therewith. Fig. 2 is a side elevation partially in section of the same. Fig. 3 is a plan view of the centering devices showing the different positions in which the same may be adjusted. Fig. 4 is a detail view showing the connection between the centering rails and the operating means therefor. Fig. 5 is a sectional view on the line x—x of Fig. 4. Figs. 6, 7 and 8 are detail views showing the means for attaching the centering-device-operating-rods to their connections at each end.

In the drawings, 2 represents a twin band saw mill having the usual toothed feed rolls 3 and 4 in front and in the rear of the saws operated from shafts 5 and 6 that are geared to a driving shaft 7. A deck 8 is provided near the saws having conveyer chains 9 driven from a chain belt 10 and arranged to receive the cants from feed rolls 11 operating in a bed 12. Arms 13, of any suitable construction, are provided in connection with the bed 12 and the deck 8 to lift the cants over upon the deck in position to be engaged by the chains 9. In front of the band saws and on each end of the feed rolls 3, we provide centering rails 13' resting upon cross bars 14, which are supported on longitudinal timbers 15. Feed rolls 16 are provided at intervals between the rails 13' and geared to the shafts 17, which are driven from chain belts 18. Upon each end of the cross bars 14 we provide plates 19 adjustable lengthwise of said bars between lugs 20 thereon by means of set-screws 21, said plates being normally secured to their cross bars by bolts 22 which pass through slots in said plates. By the adjustment of these plates the travel of the centering bars toward or from each other can be regulated. Upon the plates 19 upright studs 23 are mounted having reduced upper ends 24 which fit within guideways 25 provided in brackets 26 that are securely bolted to the outside of the rails 13', there being preferably two pair of these brackets one at the front end of the rails and the other near the rear ends thereof, though others may be employed if preferred, and the guideways are arranged in their brackets obliquely with respect to the rails whereto the brackets are secured.

The guideways are of sufficient length to allow the required range of movement of the centering rails and permit them to be separated a sufficient distance to receive cants of large size between them or moved toward one another to center a small cant, as indicated by dotted lines in Fig. 3. The position of the guideways in their brackets will cause the centering rails to have a combined lengthwise and transverse movement; and to operate them simultaneously during the operation of centering a cant on the feed rolls we provide a cylinder 27 arranged preferably beneath the floor 28 and having its piston rod 29 connected by a link 30 with an upright lever 31 pivoted at a point intermediate to its ends and projecting up through the said floor and having a fork 32 at its upper end, in which a rocker 33 is pivoted. A socket 34 is provided in this rocker wherein the ends of rods 35 are inserted and secured by a single pivot pin 36. Each centering rail is provided with a depending bracket 37 having a forked lower end wherein a rocker, corresponding to the one described above, is pivoted and to which the forward ends of the rods 35 are pivotally attached, thus forming universal joints at each end of said rods which allow the centering rails to be moved back and forth without any cramping or binding of the connections between them and the lever 31. The cylinder valve 39 is connected to a rod 40 which is operated by a lever 41 within convenient reach of the attendant. Levers 42 and 43 control the saws and the operation of the feed rolls. When the cants pass from the deck 8 upon the feed rolls between the centering rails, the operator will move the lever 41 and draw the centering rails toward one another and center the cant on the rolls, then separate the centering rails and allow the cant to be moved forward until it is engaged by the toothed feed rolls 3. At this point a toothed wheel 44 mounted in the lower end of an arm 45 engages the top of the cant and holds it firmly on the feed rolls. The arm 45 is pivoted at 46 and the wheel 44 is preferably driven through a sprocket chain connection 47 with a shaft 48, which in turn is driven through a chain 49 from the feed roll shaft 5. After the cant is engaged by the toothed feed rolls it may be centered again before reaching the saws by means of the centering bars. These bars move in unison with one another, and have the same travel and are properly adjusted with respect to the saws, so that when the cant is delivered between them and clamped by the rails it will be centered with respect to the feed and properly alined with the cutting edges of the saws, and a uniform cut will be made on each side of the cant. All this is done very rapidly and much faster than is possible with the means heretofore employed for this purpose.

It will be noted that the inclination of the guideways is toward the saws or in the direction of travel of the cants, and consequently if the rails remain in their clamped position too long after the cant engages the feed rolls, the strain or pull of the rolls on the cant will have the effect of drawing the rails toward the saws and separating them sufficiently to allow the cant to travel freely. The proper adjustment of the studs 23 in their guideways to regulate the travel of the centering rails is obtained by moving the plates 19 back and forth, and when this adjustment is once obtained further movement of these plates will be unnecessary during the operation of the apparatus, unless some special occasion arises for a re-adjustment.

On the discharge side of the saws a way 50 is provided having driven rolls 51, to which the cants are delivered from the feed rolls 4 and side delivery chains 52 operating over a deck 53 from which the cants after passing once through the saws are delivered to a return way 54, having a series of driven rolls 55, on which the cants are returned to a deck 56 with transversely operating chains 57 driven from a chain belt 58 and located on the side of the centering rails opposite from the deck 8, the starting point of the cants.

By means of this apparatus a cant can be delivered to the centering rails and feed rolls on one side and moved past the saws and a board taken off on each side and then returned to the feed rolls and centering rails on the other side, and the operation repeated.

In place of the feed rolls operating between the centering rails, a chain might be substituted which we have thought unnecessary to illustrate, as its use in place of the rolls and as a full equivalent therefor is fully understood. Furthermore, we do not wish to be confined to the particular means employed for operating the centering rails and imparting the combined lengthwise and lateral movement thereto, as the same is capable of various modifications without departing from the spirit of our invention.

We claim as our invention:

1. The combination of a saw, means for feeding a cant thereto, a longitudinally and laterally movable centering device, means for guiding said device laterally as it is moved longitudinally, and means for moving the device into operative and inoperative position for centering, substantially as described.

2. The combination of a saw, means for positively feeding a cant thereto, longitudinally and laterally movable centering rails to center a cant on the feeding means, positively actuated means for moving said rails forward and backward, and means for spreading the rails to and from each other in their forward and backward movements.

3. The combination with a saw, of means for feeding the cants thereto, centering rails having a combined lateral and longitudinal movement to center the cants upon said feeding means, said rails in centering the cant having a movement in the opposite direction to the travel of the cant to the saw, and means for primarily shifting the rails longitudinally to spread them apart or draw them towards each other.

4. The combination with the twin saws, of means for feeding the cants between them, clamping devices arranged to center the cants on said feeding means, and said clamping devices being arranged to yield lengthwise in the direction of movement of said feeding means, for the purpose specified.

5. The combination with twin saws, of means for feeding a cant between them, rails operating upon each side of said feeding means to center the cant thereon, said rails having a combined lengthwise and lateral movement, means for guiding said rails laterally in their longitudinal movement, and positively actuated means for moving said rails forward and backward, substantially as described.

6. The combination with twin saws, of means for feeding a cant between them, centering rails provided on each side of said feeding means, power actuated mechanism within control of the operator for moving said centering rails toward one another simultaneously to center the cant on said feeding means, and means for spreading said rails apart in movement of the rails toward the saw.

7. The combination with twin saws, of means for feeding a cant between them, centering rails, brackets having guideways thereon obliquely arranged with respect to the direction of movement of said feeding means, studs fitting within said guideways and whereon said rails and brackets have a combined lengthwise and lateral movement, and mechanism for operating said rails.

8. The combination with twin saws, of feeding means therefor, centering rails, brackets mounted thereon and having obliquely arranged guideways, plates having studs fitting within said guideways, and means for adjusting said plates transversely with respect to said centering rails.

9. The combination with a deck having means for moving a cant thereon, of twin saws, feeding means located between said saws and deck and arranged to receive a cant from said deck and feed it between said saws, a discharge way having driven rolls arranged on the delivery side of said saws, a return way having driven rolls, a conveyer arranged to receive the cants from said discharge way and deliver them to said return way, a second log deck arranged near the discharge end of said return way and having a cant-moving means thereon arranged to return the cant to said feeding means, and cant-centering devices operating in connection with said feeding means, substantially as described.

10. The combination, with twin saws, of feeding means located between said saws, a discharge way having driven rolls arranged on the delivery side of said saws, a return way having driven rolls, a conveyer arranged to receive the cants from said discharge way and deliver them to said return way, a deck arranged near the discharge end of said return way and having a cant moving means thereon arranged to deliver the cant to said feeding means, and centering devices operating in connection with said feeding means, substantially as described.

In witness whereof, we have hereunto set our hands ARNO MEREEN, at Chicago, Cook Co. Illinois, this 18th day of November 1905, and ANDREW E. GAGNON, at Minneapolis, Minn. this 15th day of November, 1905.

ARNO MEREEN.
ANDREW E. GAGNON.

Witnesses to Arno Mereen:
H. D. PETTIBONE,
H. O. PIERCE.

Witnesses to Andrew E. Gagnon:
RICHARD PAUL,
M. E. SCOTT